April 5, 1927.
E. H. REMDE
1,623,554
STEERABLE WHEEL CONSTRUCTION
Filed Nov. 15, 1922
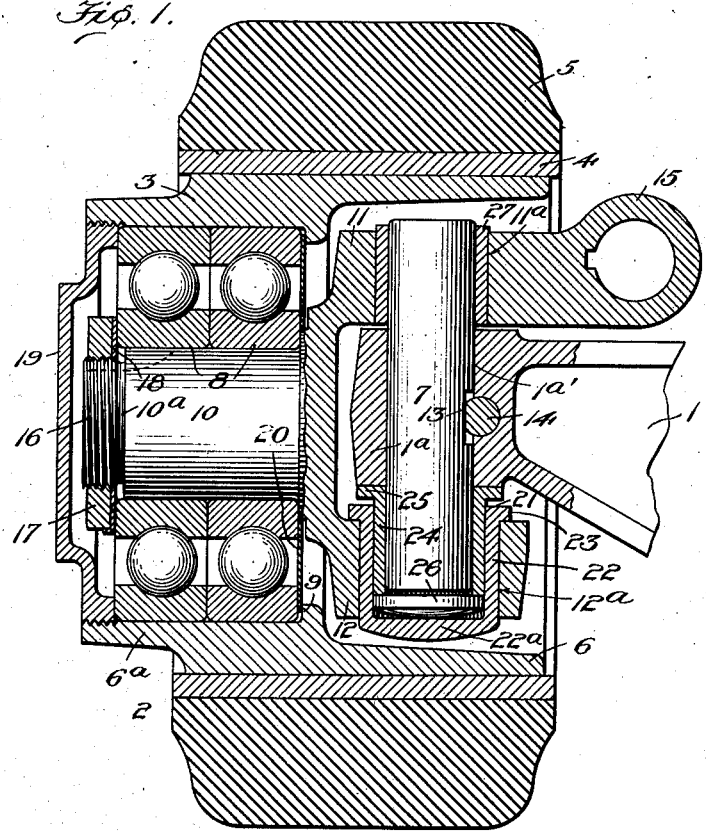
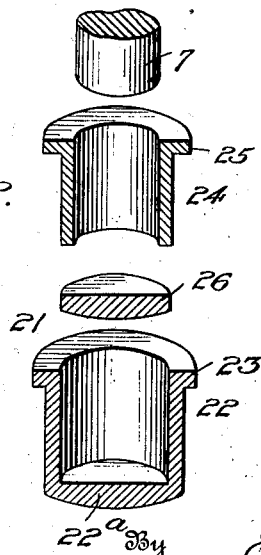
Inventor
Edward H. Remde
By Edward R. Alexander
Attorney Patented Apr. 5, 1927.

1,623,554

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

STEERABLE WHEEL CONSTRUCTION.

Application filed November 15, 1922. Serial No. 601,098.

This invention relates to a steerable wheel construction, more particularly to the axle, wheel spindle and steering knuckle of one or more wheels for a vehicle.

The invention may be applied to and embodied in any desired type of vehicle and also vehicle wheels which are driven. In putting my invention into actual use I have applied it to and embodied it in the trailing or load supporting wheels and axle of an industrial truck, more particularly a truck of this character in which a portion of the truck frame is dropped or arranged relatively low to the supporting surface, but, such use and application of my invention is merely by preference and for illustrative purposes.

One object of the invention is to provide an improved steering knuckle joint, wheel spindle and axle construction in which the weight of the vehicle and the load thereon is carried by the knuckles independently of the pivot pin for the knuckle joint, so as to leave the pivot pin free to function as the pivot for the wheel.

Another object of the invention is to provide an improved steering knuckle joint of relatively simple construction, the elements of which are constructed and arranged to reduce the stresses on the pivot pin of the joint, whereby steering operations may be effected in an easy and ready manner.

Another object of the invention is to provide an improved steering knuckle joint wherein (a) the load due to the weight of the vehicle frame and any load or weight thereon is carried by the knuckles independently of the pivot pin for the joint and (b) the bearing elements which carry the load between the knuckles are so arranged and correlated as to reduce to a minimum the friction between them incident to the steering operations.

Other objects of the invention will be apparent to those skilled in the art to which my invention relates from the following description taken in connection with the accompanying drawing, wherein—

Fig. 1 is a sectional view of a wheel, wheel spindle, an axle and a steering or knuckle joint between the spindle and axle, embodying my invention.

Fig. 2 is a fragmentary sectional view of certain elements of the knuckle joint, separated.

In the drawings, 1 indicates an axle for a vehicle or vehicle frame (not shown), only a portion of one end of the axle being shown. The axle 1 may be of any desired construction. As already stated, my invention is shown, for illustrative purposes, as adapted for use in an industrial truck, preferably that type of truck having a drop or low lying frame section, one example of which is shown in my copending application filed April 14, 1922, Serial No. 552,780. 1ª indicates a knuckle formed on the end of the axle 1, it being understood that the opposite end of the axle 1 is similarly constructed.

2 indicates a wheel, preferably comprising a hub 3, a felloe or rim 4 and a tire 5 of suitable material, such as rubber or rubber compound. These elements may be of any desired type and construction. The hub 3 and felloe 4 may be connected together in any desired manner, but preferably have a telescoping relationship, as illustrated in the drawing, and are united in a well known manner. By preference, the hub 3 is shaped to form (1) near its inner end but within or between the side edges of the wheel 2—or the rim 4 thereof—a relatively large hollow portion 6 adapted to receive the steering knuckle joint, of which the knuckle 1ª already referred to forms a part, whereby the axis of a pivot pin 7 (to be later referred to), upon which the wheel 2 is swingable for steering purposes, is arranged in the plane of the tread of the wheel 2 and (2) near its outer end a seat 6ª for anti-friction bearings 8. There are preferably two sets of bearings 8, the inner set engaging an annular shoulder 9, which is so arranged that the bearings, or the inner set thereof is arranged in the plane of the tread of the wheel 2. 10 indicates a wheel axle or spindle, provided at its inner end with upper and lower knuckles 11, 12, having openings 11ª, 12ª, respectively, arranged to align with the opening 1ª' formed in the knuckle 1ª, so as to receive the pivot pin 7 and be pivotally connected thereby. The pivot pin 7 is preferably cut away at one side to form a keyway 13, so that a key 14 may be inserted in a key-way formed in the knuckle 1ª and thus fix the pin 7 to the latter. The keyway 13 is preferably of greater width than that portion of the key 14 with which it engages in order that the pivot pin 7 may move endwise in the knuckles 1ª, 11, 12, for a purpose to be later set forth.

The upper knuckle 11 is preferably provided with an arm 15 adapted to have connected to it a suitable steering connection (not shown), by means of which the wheel 2 may be operated about the pivot pin 7.

The outer end of the wheel spindle 10 is preferably reduced, as shown at 10ª, and such reduced end is provided with screw threads 16 to receive a nut 17, which engages the outer anti-friction bearing 8 and maintains both bearings in position with the inner one against the shoulder 9. 18 indicates a washer arranged between the nut 17 and the bearing 8. This washer may be of the locking type, if desired, to lock the nut in adjusted position. 19 indicates a cap having screw thread engagement with the inner wall of the hub 3 and serving to keep dirt and other foreign matter out of the bearings 8. 20 indicates an annular member disposed between the inner bearing 8 and the shoulder 9 and serving to close the bearings at their inner side against the entry of foreign matter.

21 indicates devices interposed between the axle 1ª and one of the spindle knuckles 11 or 12 and arranged to carry or support the weight of the vehicle frame and any load thereon independently of the pivot pin 7, thereby relieving the latter of strains in a vertical direction due to the weight of the vehicle frame or its load and permitting the pin to more freely function as a shaft or pivot for the steering wheel 2. The devices 21 are preferably arranged between the lower side of the knuckle 1ª and the lower knuckle 12 of the wheel spindle 10. The supporting devices 21 comprise the following instrumentalities: a cup shaped member 22 fitting within the opening 12ª in the knuckle 12 and provided with a flange 23 which engages the upper face of the knuckle 12 to support the member 22 in the opening 12ª; a tubular member 24, with which the under side or face of the knuckle 1ª engages, sleeved on the lower free end of the pivot pin 7 and loosely fitting within and rotatably engaging the inner walls of the cup shaped member 22, so as to rotate therein—being preferably provided with a flange 25 to form a relatively wide surface for engagement with the knuckle 1ª; and a thrust or bearing element 26 between the lower circumferential end of the tubular member 24 and the bottom 22ª of the cup shaped member 22. The lower face of the thrust element 26 is preferably spherical shaped to provide a point contact and to arrange such point in alignment with the axis of the pivot pin 7, thereby reducing the friction between the load supporting devices to a minimum. Due to the frictional engagement of the cup shaped member 22 and its flange 23 with the walls of the opening 12ª and upper face of the knuckle 12 and of the tubular member 24 with the under face of the knuckle 1ª, they have fixed relationship thereto, respectively, and rotate relative to each other when the wheel is steered; likewise, the frictional engagement between the tubular member 24 and the thrust element 26 will cause it to rotate therewith on the bottom 22ª.

From the foregoing description it will be seen that the weight of the vehicle frame and the load thereon is transmitted through the knuckle 1ª to the tubular member 24 and from the latter through the thrust element 26 direct to the cup shaped member 22, which is supported in and by the lower knuckle 12, independently of the pivot pin 7, thereby relieving the pin of strains or stresses incident to this weight in a vertical direction and permitting it to function freely as the steering shaft or post or pivot for the wheel 2. It will also be seen that the load supporting devices 22, 24, are concentrically arranged, one rotating within the other, and that by the inter-positioning between them of a thrust element having a spherical lower surface, the devices 22, 24, move relative to each other with minimum friction and their axis of rotation is disposed in line with the axis of the pivot pin 7. In addition to their load carrying or supporting function, the members 22, 24, serve as a bearing to support the lower end of the pivot pin 7 in the knuckle 12.

The pivot pin 7 is preferably separated at its lower end from the thrust or bearing element 26 to prevent any portion of the weight of the vehicle frame being carried by it. To insure this result, the keyway 13 is widened, as already described, to permit the pin 7 to be so positioned in the knuckle 1ª that its lower free end will not engage the thrust or bearing element 26.

27 indicates a bushing, which is preferably provided in the opening 11ª of the upper knuckle 11 to serve as a bearing for the upper end of the pivot pin 7.

By supporting the load—the vehicle frame and the material or products which may at any time be supported thereon—directly between the knuckles of the steering joint, the strains and stresses incident thereto in a vertical direction are materially minimized, thereby (1) permitting steering to be effected relatively easy and (2) reducing wear on the pivot pin. Furthermore, the construction permits the pivot pin to be supported in position and the knuckles maintained in axial alignment by relatively simple means, to wit, an ordinary cotter pin or key engaging the pin and one of the knuckles. The simplicity of the construction lends itself advantageously for embodiment in a relatively small wheel, more particularly where in such application of the invention the knuckle joint is disposed within the wheel structure to position the axis of the pivot pin in the plane of the tread of the wheel.

To those skilled in the art to which my invention relates, many alterations in and widely differing embodiments and applications of my invention will suggest themselves without departing from the spirit and scope thereof. The disclosures and the description herein are purely illustrative and are not intended to be in any sense limiting.

What I claim is:

1. In a steering wheel construction for a vehicle, the combination of an axle having a knuckle at its end, a wheel spindle having upper and lower knuckles arranged to align with said axle knuckle, a pivot pin disposed in the openings in said knuckles, a cup shaped member supported in the opening in said lower spindle knuckle, a tubular member engaging the under side of said axle knuckle, sleeved on said pin and rotatably fitting said cup shaped member, and a thrust element interposed between the lower end of said tubular member and the bottom of said cup shaped member, whereby the weight of the vehicle frame is carried by said knuckles independently of said pivot pin, the under side of said thrust element being spherical to provide a point contact in line with the axis of said pivot pin.

2. In a steering wheel construction for a vehicle, the combination of an axle, a wheel, an axle for said wheel, a joint between said axles comprising knuckles and a pivot pin disposed in the openings in said knuckles, a pair of annular elements surrounding one end of said pivot pin and engaging said knuckles, respectively, one of said elements having a wall at one end, and a thrust device between said wall and the adjacent end of the other annular element, whereby said elements and thrust device carry the weight of the vehicle frame independently of said pivot pin.

3. In a steering wheel construction for a vehicle, the combination of an axle having a knuckle at its free end, a wheel, a spindle for said wheel having knuckles arranged to align with the knuckle on said axle, a pivot pin disposed in the openings in said knuckles, a pair of concentrically arranged elements, the outer element fitting within the lower knuckle of the joint and having a bottom and the inner element engaging the intermediate knuckle of the joint, and a thrust member disposed between said elements and engaging said bottom at a point in line with the axis of said pivot pin and arranged to carry the weight of the vehicle frame independently of said pivot pin.

4. In a steerable wheel construction for a vehicle, the combination of an axle, a wheel, a joint between said axle and wheel comprising spaced knuckles, an intermediate knuckle and a pivot pin extending therethrough, a cup shaped member disposed within one of the spaced knuckles and having a flange engaging the inner wall thereof, a tubular member sleeved on the end of said pivot pin adjacent said cup member and engaging at one end the wall of the intermediate knuckle adjacent said flange and rotatably fitting said cup member, and thrust means interposed between the opposite end of said tubular member and the end wall of said cup member, whereby the weight is carried by said knuckles independently of said pivot pin.

5. In a steering wheel construction for a vehicle, the combination of an axle, a wheel spindle, a joint between said axle and said spindle comprising knuckles and a pivot pin therefor, and means comprising a pair of concentric relatively movable devices surrounding the pivot pin of said joint and engaging an axle knuckle and a spindle knuckle, respectively, and a thrust element between said devices arranged to carry the weight of the vehicle frame independently of the pivot pin for said joint.

6. A steering wheel construction as claimed in claim 2 in which the end wall of one of said annular elements comprises a plane surface and the opposing face of said thrust device is spherical to provide point contact therebetween in line with the axis of said pivot pin.

In testimony whereof, I have hereunto subscribed my name.

EDWARD H. REMDE.